3,231,711
FREQUENCY CONTROLLED WELDING ARC POWER SUPPLY SYSTEM
William W. Gibson, Alameda, and Hayashi Yeichi, Oakland, Calif., assignors to Glenn Pacific Corporation, a corporation of California
Filed May 23, 1963, Ser. No. 282,675
6 Claims. (Cl. 219—131)

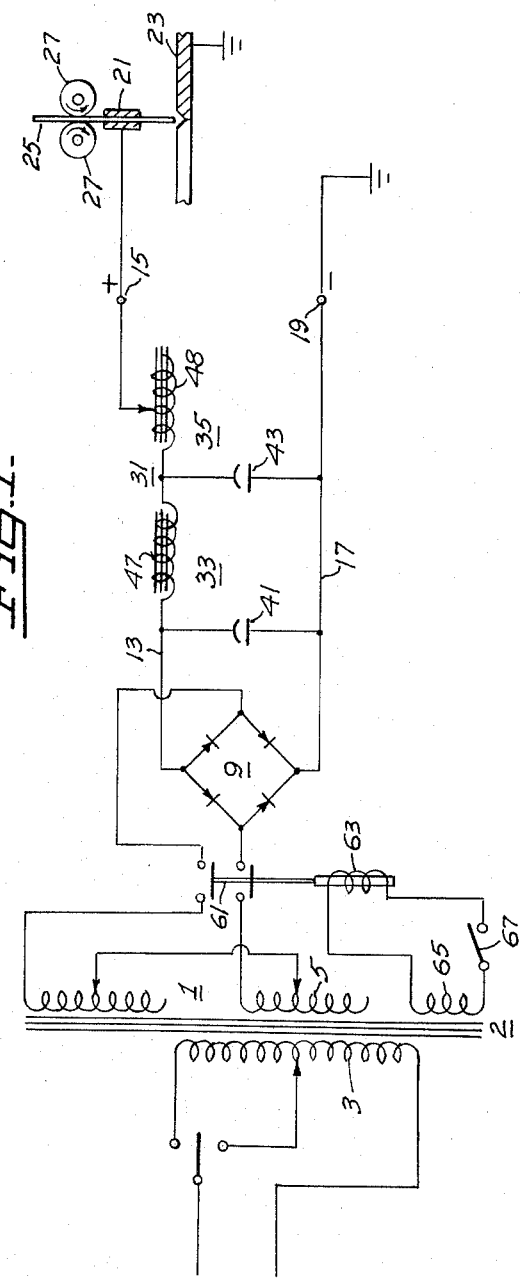

Our invention relates to welding and more particularly to short arc welding and a power supply system therefor, and is an improvement on the invention of application of Glenn and Gibson for High Efficiency Auto-Modulated Welding Arc Power Supply, Serial No. 103,486 filed April 17, 1961, now Patent No. 3,136,884 of June 9, 1964.

The invention of the aforementioned application relates to a power supply system for use in automatic or semi-automatic short arc welding, wherein small diameter electrode wire of the order of .03 plus or minus inch, is fed at a uniform rate to the work to be welded, while suitable welding potential is applied between the electrode wire and the work.

The power supply system is of the constant potential type, involving a step-down transformer, feeding into a rectifier bridge, the output of the rectifier bridge being passed into a tunable tank circuit connected between the electrode wire and the work. The tank circuit is shorted by the arc at a frequency which is a function of the rate of feed of the electrode wire, and by adjusting the tank circuit frequency to a compatible frequency, which may be the frequency at which the electrode wire shorts the tank circuit and burns off with minimum of splatter, which we term the droplet frequency, or a harmonic thereof, a smooth, substantially splatter free weld will be realized. For our purposes, we prefer that the tank circuit be tunable through a frequency range of the order of 20–120 cycles.

Frequency adjustment of the tank circuit at times, however, has been difficult to achieve smoothly and with ease.

Among the objects of our invention are:

(1) To provide a novel and improved power supply system for use in automatic or semi-automatic welding, and more particularly short arc welding;

(2) To provide a novel and improved power supply system of the character described above, but which is capable of being adjusted to a compatible frequency, smoothly and with ease;

(3) To provide a novel and improved power supply system for use particularly in short arc welding;

(4) To provide a novel and improved power supply system for short arc welding, capable of being readily adjustable to prevailing conditions of use.

Additional objects of our invention will be brought out in the following description of a preferred embodiment of the same, taken in conjunction with the accompanying drawings wherein:

FIGURE 1 is a circuit diagram of the power supply system of the present invention;

FIGURE 2 is a diagram depicting in a general way, the arc voltage curve and the relationship of the tunable tank circuit thereto.

The present invention is predicated on our discovery that the difficulty sometimes experienced in tuning the tank circuit of the aforementioned earlier application, to a frequency compatible with the droplet frequency of the arc, could be attributed to a power frequency ripple, and/or strong harmonic thereof, carried over from the power line frequency and apparently superimposed on the rectified current and voltage. As such, the ripple tended to synchronize or control the frequency of the tank circuit and thereby restrain the tank circuit from resonating at frequencies departing appreciably from the fundamental frequency of the power lines from which power was being derived.

On the basis of this discovery, we have solved the problem through the elimination of such derived power line ripple frequency.

Referring to the drawings for a description of our invention in its preferred form, the circuit comprises a source 1 of alternating current voltage which is adjustable to produce alternating voltages within the range of conventional welding voltages of say 7 to 50 volts. Such source of alternating current voltage may include a variable step-down transformer 2 having a primary winding 3, tapped for connection to commercial power sources of different voltages to realize the desired range of welding voltages across a pair of secondary windings 5, which are also tapped to permit of selection of a desired welding voltage within such range.

The output of the secondary windings is connected across a full wave rectifier 9, preferably one utilizing rectifiers of the semi-conductor type, such as silicon rectifiers, to provide a rectified voltage of comparable value.

The positive side of the full wave rectifier is coupled by a connection 13 to a positive load terminal 15, while the negative side of the rectifier is similarly connected by a connection 17 to a negative load terminal 19, such terminals being provided for connection, one to electrode 21, the other to the work 23 to be welded, or in other words across the arc gap.

The electrode 21 is one through which electrode wire 25 is fed at a constant rate, by and between a pair of feed rolls 27.

In short-arc welding, the electrode wire is generally of very small diameter of the order of .03 plus or minus inch, and is fed to the work at a rate varying from an approximate maximum of 10 inches per second, down to a rate of the order of .5 inch per second for very light gauge material to be welded. The present invention is particularly applicable to the welding of very light gauge material wherein a very delicate control of the droplet frequency is necessary in order to avoid burning through the thin gauge material being welded.

Between the rectifier bridge and the load terminals is a filter 31 of at least two stages 33, 35 . . . etc., each comprising a capacitor 41, 43 respectively, connected between the line 13 and line 17, and a reactor 47, 48 respectively in one of the lines, preferably the line 13, the latter reactor 48 being preferably variable.

In the first stage 33, the capacitor 41 may be made up of bank of condensers providing a capacitance within a range of 20,000 micro-farads to 80,000 micro-farads, while the reactor 47 may be fixed and of a value within the range of one to three milli-henries.

The second stage 35 may have a capacitance comparable to that of the first stage, and an inductance which may be varied within a range of approximately 2 milli-henries to 3 milli-henries.

This latter stage of the filter may be considered as constituting a tank circuit, comparable to the tank circuit of the aforementioned application of Glenn and Gibson, the adjustable character of the reactor rendering the tank circuit tunable within a frequency range determined by the value of the capacitance and the range of values obtainable from the variable reactor.

The droplet frequency is a function of the rate of wire feed to the work and the characteristics of the voltage applied across the arc gap. The rate of wire feed is predetermined largely by the welding current required to perform the particular welding operation under consideration, and accordingly, does not permit of any wide range of adjustment to vary arc characteristics. Besides, arc characteristics are not very sensitive to changes in the feed rate of the welding wire.

As viewed on the screen of an oscilloscope connected to record the voltage variation across the arc gap, an average voltage curve such as depicted in FIGURE 2 of the drawings is observable.

Referring to the curve of FIGURE 2, the lower rising slope portion 49 of each cycle apparently represents the charging curve of the capacitor 43, the angle of the slope being indicative of the rate of charge. Apparently, when the voltage across the capacitor builds up to a certain value, as represented by the point 51, the voltage jumps to maximum value as represented by the point 53, practically instantaneously, brought about apparently by the substantial burning off of the electrode wire.

Following this, the voltage across the arc gap decays somewhat to the value 55, apparently indicative of condenser discharge with the reactor 48 in the circuit, and then instantaneously drops down to its lowest value, which apparently represents zero voltage, following which, the voltage begins to build up again at a rate determined by the charging of the condenser 43.

The resulting curve, therefore, is a function of the rate of feed of the electrode wire, and unless the tank circuit is tuned to a frequency compatible with the droplet frequency of the arc which in turn is a function of the rate of feed of the electrode wire, erratic operation at the point of welding will occur, which operation becomes more erratic, the greater the discrepancy between the droplet frequency and the frequency to which the tank circuit may be adjusted.

Accordingly, the tank circuit should have a range of frequency which encompasses the droplet frequency of the arc, as determined by the rate of feed of the electrode wire, and with such range of frequency, the tank circuit is tuned until the most optimum welding condition is realized.

With the voltage fluctuations previously derived from the rectifier output of the power supply source now drastically minimized, the tuning of the tank circuit to a frequency compatible with the droplet frequency at the arc, may be accomplished smoothly and without any problem.

In employing the power supply described above, for short-arc welding, the power is turned on and the electrode wire fed to the work at a rate determined by the current requirements. Turning on of the power may be accomplished by running the connections to the rectifier 9 through a solenoid operated switch 61 having a coil 63 connected across an auxiliary secondary winding 65 of the transformer 1, through a manually controlled switch 67.

From the foregoing description of our invention in its preferred form, it will be apparent that the same fulfills all the objects of the present invention, and while we have illustrated and described the same in considerable detail, it will be apparent that the invention is subject to alteration and modification without departing from the underlying principles involved. For example, tuning of the tank circuit may be accomplished by varying the capacitance in lieu of the reactance, or through adjustment of both. Accordingly, we do not desire to be limited in our protection to the specific details illustrated and described, except as may be necessitated by the appended claims.

We claim:

1. A welding arc power supply adapted for automatic and semi-automatic welding, comprising
    a source of direct current at substantially welding voltage,
    a pair of load terminals,
    at least a two-stage filter between said direct current source and said load terminals,
    said filter being capable of carrying current of a value required to produce welding of metal,
    and one of said stages comprising a tunable tank circuit adapted for tuning to a frequency compatible with the rate of feed of electrode wire in an automatic or semi-automatic welding system as evidenced by substantially splatter free welding in such system.

2. A welding arc power supply adapted for automatic and semi-automatic welding, comprising
    a source of direct current at substantially welding voltage,
    a pair of load terminals,
    at least a two-stage filter between said direct current source and said load terminals,
    said filter being capable of carrying current of a value required to produce welding of metal,
    the last of said stages comprising a tunable circuit adapted for tuning to a frequency compatible with the rate of feed of electrode wire in an automatic or semi-automatic welding system as evidenced by substantially splatter free welding in such system.

3. A welding arc power supply adapted for automatic and semi-automatic welding, comprising
    a source of alternating current at substantially welding voltage,
    means for rectifying the output of said source,
    a pair of load terminals,
    at least a two-stage filter between said rectifier means and said load terminals,
    said filter being capable of carrying current of a value required to produce welding of metal,
    and one of said stages comprising a tunable tank circuit adapted for tuning to a frequency compatible with the rate of feed of electrode wire in an automatic or semi-automatic welding system as evidenced by substantially splatter free welding in such system.

4. A welding arc power supply adapted for automatic and semi-automatic welding, comprising
    a source of alternating current at substantially welding voltage,
    means for rectifying the output of said source,
    a pair of load terminals,
    at least a two-stage filter between said rectifier means and said load terminals,
    said filter being capable of carrying current of a value required to produce welding of metal,
    the last of said stages comprising a tunable tank circuit including condenser means and reactor means, with at least one of said last two means being adjustable to tune said circuit to a frequency compatible with the rate of feed of electrode wire in an automatic or semi-automatic welding system as evidenced by substantially splatter free welding in such a system.

5. A welding arc power supply adapted for automatic and semi-automatic welding, comprising
    a source of alternating current at substantially welding voltage,
    said source including a transformer providing a secondary voltage within a welding range,
    means for rectifying the output of said transformer,
    a pair of load terminals for connection to an electrode and work to be welded,
    at least a two-stage filter between said rectifier means and said load terminals,
    said filter being capable of carrying current of a value required to produce welding of metal,
    and one of said stages comprising a tunable tank circuit including condenser means and reactor means, with at least one of said last two means being adjustable to tune said circuit in a frequency range of the order of 20–120 cycles.

6. A welding arc power supply adapted for automatic and semi-automatic welding, comprising
    a source of alternating current at substantially welding voltage,
    said source including a step-down transformer providing a secondary voltage within a welding range,
means for rectifying the output of said step-down transformer,
a pair of load terminals for connection to an electrode and work to be welded,
at least a two-stage filter between said rectifier means and said load terminals,
said filter being capable of carrying current of a value required to produce welding of metal,
and one of said stages comprising a tunable tank circuit including condenser means and reactor means, with at least one of said last two means being adjustable to tune said circuit in a frequency range of the order of 20–120 cycles.

References Cited by the Examiner
UNITED STATES PATENTS

| | | | |
|---|---|---|---|
| 1,821,016 | 9/1931 | Ka Dell | 321—10 |
| 1,844,977 | 2/1932 | Replogle | 321—10 |
| 2,414,363 | 1/1947 | Dietert et al. | 315—243 X |
| 2,891,196 | 6/1959 | Lisser | 315—242 |
| 3,136,884 | 6/1964 | Glenn et al. | 319—131 |

RICHARD M. WOOD, *Primary Examiner.*